United States Patent
Huang et al.

(10) Patent No.: US 6,635,302 B1
(45) Date of Patent: *Oct. 21, 2003

(54) MILK PROTEIN DISPERSIONS

(75) Inventors: Victor T. Huang, Moundsview, MN (US); Diane R. Rosenwald, Plymouth, MN (US)

(73) Assignee: The Pillsbury Company, Minneapolis, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,129

(22) Filed: Nov. 20, 1998

(51) Int. Cl.$^7$ .............................................. A23C 9/142
(52) U.S. Cl. ...................................... 426/587
(58) Field of Search ................................. 426/565, 567, 426/587, 580, 491, 492

(56) References Cited

U.S. PATENT DOCUMENTS

| | | | |
|---|---|---|---|
| 4,307,123 A | | 12/1981 | Bundus ....................... 426/565 |
| 4,497,841 A | | 2/1985 | Wudel et al. ................ 426/565 |
| 5,143,741 A | * | 9/1992 | Podolski et al. ............ 426/565 |
| 5,175,013 A | * | 12/1992 | Huang et al. ............... 426/565 |
| 5,456,936 A | * | 10/1995 | Toonen ....................... 426/567 |

FOREIGN PATENT DOCUMENTS

| | | |
|---|---|---|
| CA | 2046741 | 11/1992 |
| EP | 0 308 091 | 3/1989 |
| EP | 0 316 938 | 5/1989 |
| FR | 2 644 983 | 10/1990 |
| WO | WO 86 01688 | 3/1986 |
| WO | WO 92 11769 | 7/1992 |

OTHER PUBLICATIONS

"Membrane Separation Technology Offers Processors Unlimited Potential", Food Technology, Sep. 1990, pp. 108–113.

"Oxygen–17 Nuclear Magnetic Resonance Studies of Bovine and Caprine Casein Hydration and Activity in Deuterated Sugar Solutions" by, Mora–Gutierrez et al., J. Agric. Food Chem. 45: pp. 4545–4553 (1997).

XP 002132254—Abstract of JP 12–18553 (Aug. 1988).

XP 002132255—Abstract of SU 1717067 (Mar. 1992).

* cited by examiner

*Primary Examiner*—Keith Hendricks
(74) *Attorney, Agent, or Firm*—Kagan Binder, PLLC; Daniel C. Schulte

(57) ABSTRACT

Soluble sugar can be added to a milk protein dispersion with reduced lactose to slow viscosity buildup and gelation. Preferably, greater than about 3 percent by weight soluble sugar is added to the milk protein dispersion. The resulting milk protein dispersion generally has greater than about 6 percent by weight protein, less than about 20 percent by weight lactose and greater than about 3 percent by weight soluble sugar. Preferred milk protein dispersions are low fat. The milk protein dispersions are suitable for storage for at least several days without viscosity build-ups that inhibit processing.

24 Claims, 2 Drawing Sheets

MILK PROTEIN DISPERSIONS

BACKGROUND OF THE INVENTION

The invention relates to the formation of aqueous dispersions of milk protein. More particularly, the invention relates to the formation of milk protein dispersions with a high protein concentration, a low lactose concentration and relatively low viscosity.

In frozen dessert products, the presence of significant concentrations of lactose can lead to an undesirable sandy texture due to the formation of lactose crystals upon the freezing of the dairy product. Thus, it is desirable to keep lactose levels low. If lactose is removed from the milk product, the concentration of the other constituents in the milk, particularly the milk protein, increases. High protein concentrations, however, can lead to large increases in viscosity and possibly gelation of the milk product in a relatively short period of time. The large viscosity increase makes processing difficult and can force completion of the product in an undesirably short period of time following the production of the milk protein dispersion.

SUMMARY OF THE INVENTION

In a first aspect, the invention pertains to an aqueous milk protein dispersion comprising greater than about 8.5 percent by weight protein and greater than about 3 percent by weight soluble sugar.

In another aspect, the invention pertains to a method of producing a low viscosity milk protein dispersion, the method comprising adding greater than about 3 percent soluble sugar to an aqueous milk protein dispersion having greater than about 6 percent by weight protein to form a milk-soluble sugar mixture, and storing the milk-soluble sugar mixture for more than about 2 days.

DETAILED DESCRIPTION OF THE PREFERRED EMBODIMENTS

Figure 1:
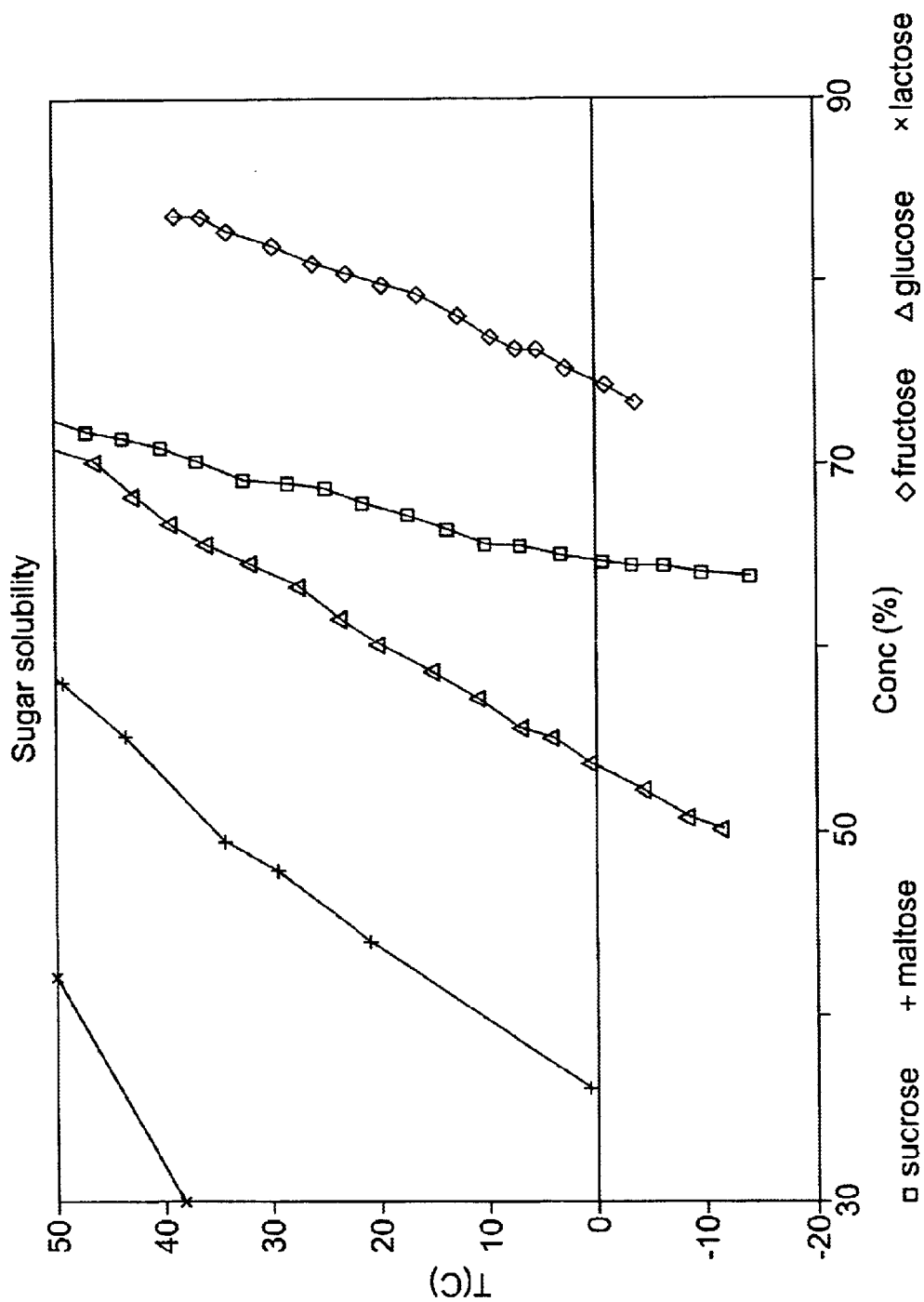
FIG. 1 is a plot of the temperature dependence of the equilibrium solubilities of several sugars in water.

A creamy textured frozen dessert product can be made with a high concentration milk protein dispersion that is blended to reduce viscosity build-up. Specifically, the addition of sufficient amounts of one or more selected suitable sugars to the milk protein dispersion produces a concentrated milk protein dispersion that does not gel upon storage at refrigeration temperatures for reasonable periods of time. In preferred embodiments, the concentrated milk protein dispersion remains at reasonable viscosities over periods of time extending at least several days. Since the product maintains a reasonable viscosity upon storage, the processing of a frozen dessert product or other product becomes considerably more versatile using standard processing equipment. The milk product can have any mammalian source, such as bovine, goat or sheep. The milk protein dispersions generally contain in varying concentrations other fat, salt, sugar and/or additional ingredients either that are added to the product or that are naturally found in the milk product.

When frozen dairy products are produced, crystals of lactose can form if lactose is present at moderately high concentrations. Lactose is a natural sugar found in milk. The lactose crystals develop because lactose has a moderate solubility in water that further decreases as the water is cooled. In other words, if the lactose concentration is high enough and the temperature is low enough, the lactose crystallizes out of solution. Since super saturated lactose solutions can freeze without forming crystals under certain conditions, the degree of crystal formation depends on additional factors such as the presence of particulates to serve as nucleation sites. Therefore, it may be desirable to remove lactose to lower the probability of crystal formation.

Generally, the removal of lactose is done by ultrafiltration using a semi-permeable membrane, or by crystallization of the lactose from, for example, concentrated milk with crystallization induced by seeding of the product with lactose crystals or other nucleation centers. The ultrafiltration is used herein for milk products that have enhanced protein concentrations and lactose removed to decrease the lactose concentration relative to the protein concentration. The starting material for the ultrafiltration is preferably a skim or reduced fat milk product, although whole milk products can also be processed by ultrafiltration to reduce the lactose content. Fluid containing lactose, a small molecule relative to the protein, various salts and other small molecules is separated from a concentrated solution containing the milk protein. Generally, significant amounts of calcium are not removed by ultrafiltration since the calcium ions are associated with casein micelles. A concentrated milk protein dispersion remains following the removal of the lactose containing solution.

The production of a concentrated milk protein dispersion is desirable since a low fat dessert product with a high protein content has a smooth and creamy texture and since shipping costs are reduced due to the removal of water. Preferably, the protein concentration is increased about two fold (2x), more preferably about four fold (4x) and even more preferably from about 4.5 fold (4.5x) to about 5.5 (5.5x) fold during the ultrafiltration process. The ultrafiltration process generally concentrates all of the milk proteins, in contrast with certain cheese production processes that concentrate only a portion of the milk proteins.

A majority, about 75–80 percent by weight, of the milk proteins in the concentrated dispersion are caseins, a class of phosphoproteins found in mammalian milk. About 15–20 percent by weight of the milk proteins are referred to as whey proteins because they are not precipitated with acid at pH 4.6 or by proteolytic enzymes. Whey proteins include, for example, $\alpha$-lactalbumin, $\beta$-lactalbumin, serum albumin, and immunoglobulins.

The ultrafiltered milk protein dispersion generally contains greater than 6 percent by weight protein, preferably greater than about 11.5 percent by weight protein, more preferably greater than about 13 percent by weight protein and even more preferably from about 14 percent to about 20 percent by weight protein. Preferably, the ultrafiltered milk protein suspension is low fat. In particular, preferred ultrafiltered milk protein dispersions have less than about 1.0 percent by weight fat and more preferably less than about 0.4 percent by weight fat.

Ultrafiltered milk protein dispersions can be frozen to make a creamy dessert product, such as low fat or fat free ice cream or frozen yogurt, following the addition of sweeteners and other desired flavorings, water and other optional ingredients, such as emulsifiers and stabilizers. Suitable emulsifiers include, for example, egg yolk, mono or di-glycerides, polyoxyethylene sorbitan monostearate (60)

and lecithin. Suitable stabilizers include, for example, agar, sodium alginate, propylene glycol alginate, calcium sulfate, gelatin, gums, carrageenan, furcellaran, microcrystalline cellulose, carboxymethyl cellulose. Alternatively, the ultrafiltered milk protein dispersions can be used to produce other products, such as cheese, yogurt, sour cream, fromage blanc, fromage frais, and the like. The ultrafiltered low fat milk protein dispersions, however, have a viscosity that rapidly increases with the passage of time following their formation and prior to freezing. This very rapid increase in viscosity can make commercial processing into frozen dessert products and other products very difficult. Furthermore, after a relatively short period of time, the dispersion can form a gel that does not flow. Once the milk product forms a gel, it cannot be processed with standard commercial equipment. The increase in viscosity and gel formation apparently are the result of protein agglomeration.

Gelation and the viscosity increase generally can be slowed by adding back measured amounts of the previously removed lactose and salt. Quantities of lactose and salts can be added by mixing a selected amount of condensed, i.e., concentrated, milk, such as condensed skim milk, with the ultrafiltered milk protein dispersion. The use of condensed milk provides for maintaining high protein concentrations, while adjusting the lactose level. The condensed milk product is produced by removing water from a milk product by evaporation. While the addition of condensed milk slows the gelling time at acceptable levels of lactose, the undesirable viscosity increase still occurs over periods of time that require relatively rapid processing of the milk product after ultrafiltration.

Either ultrafiltered milk or ultrafiltered milk with added condensed milk can serve as starting material for blending with a soluble sugar to reduce the rate of viscosity increase. However the starting material is produced, the starting milk protein dispersion preferably has a lactose concentration within a range such that lactose crystals do not form in significant amounts upon freezing of the milk dispersion. The protein content is sufficiently high to produce a frozen dessert product with a smooth and creamy consistency. Specifically, the milk protein dispersion preferably has a lactose concentration less than about 12 and more preferably less than about 9 percent by weight. In addition, the milk protein dispersion generally has a protein concentration greater than about 6 percent by weight, preferably greater than about 8.5, more preferably greater than about 11 percent by weight and even more preferably from about 14 percent by weight to about 20 percent by weight. For the production of preferred low fat or non-fat dessert products, the milk protein dispersion preferably has a concentration of fat less than about 1.0 percent by weight and more preferably less than about 0.4 percent by weight.

To increase versatility for commercial processing, it has been discovered that the addition of sugars other than lactose or the addition of hydrogenated sugars can slow the viscosity build-up and slow or stop the gelation of concentrated aqueous milk protein dispersions. Preferred sugars do not form crystals upon freezing at desired concentrations within the product. In other words, at the freezing point of the aqueous solution, the non-lactose sugar still has a solubility greater than the concentration of added sugar such that no sugar crystals are formed. The concentration of added sugar is sufficient to inhibit a large increase in the viscosity of the product over the course of several days, as specified further below.

Suitable sugars to retard viscosity build-up of the milk protein dispersion shall be referred to as a "soluble sugar" herein. Preferred soluble sugars have an equilibrium solubility in 0° C. water of greater than about 20 percent by weight and more preferably greater than about 30 percent by weight. In addition, suitable soluble sugars have a super saturated solubility, which is the maximum solubility of a supersaturated sugar solution upon rapid cooling, of greater than about 30 percent by weight and more preferably greater than about 35 percent by weight. Preferred soluble sugars include, for example, sucrose, fructose, dextrose, maltose, and mixtures thereof. A plot of the temperature dependence of equilibrium solubilities for these sugars is depicted in FIG. 1. Generally, any low molecular weight sugar, monosaccharide, disaccharide, oligosaccharide or mixtures thereof, can be used as the soluble sugar if it has suitable solubility properties. The soluble sugar can be added in the form of a aqueous solution such as corn syrup including, for example, high fructose corn syrup, high maltose corn syrup, or high dextrose equivalent corn syrup with a dextrose equivalent factor of about 36 or higher.

Alternative to the addition of a soluble sugar, a soluble polyol can be added to the milk protein dispersion to slow the viscosity build-up. Suitable soluble polyols generally have a relatively low molecular weight and from 3 carbons to about 15 carbons. These low molecular weight polyols generally have varying degrees of sweet taste. Preferred soluble polyols have an equilibrium solubility in 0° C. water of greater than about 20 percent by weight and more preferably greater than about 30 percent by weight. In addition, suitable soluble polyols have a super saturated solubility, which is the maximum solubility of a supersaturated sugar solution upon rapid cooling, of greater than about 30 percent by weight and more preferably greater than about 35 percent by weight. The polyols can be the hydrogenated form of sugars. Suitable soluble polyols include, for example, isomalt, maltitol, lactitol, sorbitol, xylitol, glycerol, hydrogenated corn syrup, and mixtures thereof. In the discussions herein, the description of the addition of soluble sugars can involve the substitution of soluble polyols for some or all of the soluble sugars.

After the addition of the soluble sugar, the aqueous milk protein dispersion generally has a concentration of soluble sugar greater than about 3 percent by weight. Preferably, the aqueous milk protein dispersion has a concentration of soluble sugar greater than about 4 percent by weight, more preferably greater than about 5 percent by weight and even more preferably from about 7.5 percent by weight to about 25 percent by weight.

Viscosity measurements can be used to quantify the flow properties of the milk protein dispersions. In general, the measured viscosity values can depend on the approach used to measure the viscosity since the viscosity of the protein dispersions depend on the shear rate. Except as otherwise indicated, viscosity values discussed herein are viscosities at 40° F. that are determined by the application of a shear to the dispersion using a rotating spindle, as described further in the following paragraph. The concentrated milk protein dispersion with the added soluble sugar preferably does not increase in viscosity beyond about 2000 cps three days following its formation, and preferably less than about 1200 cps, and more preferably less than about 800 cps three days following formation of the aqueous dispersion. The concentrated milk protein dispersion with the added soluble sugar preferably does not increase in viscosity beyond about 8000 cps seven days following its formation, and preferably less than about 5000 cps, and more preferably less than about 2500 cps seven days following formation of the aqueous dispersion.

Values of viscosity given in the previous paragraph are measured with a viscometer using a rotating spindle. The 8 ml volume of sample is placed within a straight-sided cup that has a 1.9 cm diameter and a 6.25 cm height. The spindle has a cylindrical section with a diameter of 1.6 cm and a thickness of 3 cm. There are conical sections of 0.75 cm each at each end of the cylindrical section tapering from the 1.6 cm diameter to a point at the tip of the spindle and to the shaft at the top of the cylindrical section. This spindle corresponds to a spindle #21 sold by Brookfield Engineering Laboratories, Stoughton, Mass. The spindle is rotated at 50 rpm, and the sample is kept at 40° F. A suitable instrument for the performance of these measurements is a Brookfield Viscometer model HATDV-II from Brookfield Engineering Laboratories. References to viscosity in the claims below corresponds to viscosity measurements as described in this paragraph.

To form a dessert product, a variety of ingredients can be added. In particular, additional sweetener generally is added along with water and possibly other milk products. The water and similar liquids generally are added in sufficient quantities to obtain a desired level of milk proteins. In low fat or skim milk products, the protein concentration of the frozen dessert product preferably is between about 5 percent by weight to about 11 percent by weight. In addition, the product preferably freezes such that a smooth product is formed that is free of detectable lactose crystals. Generally, the frozen dessert product has added flavors, nuts and the like, as desired.

With respect to processing considerations, ultrafiltration can be performed to reduce the quantity of lactose and to concentrate the protein of a starting milk product, preferably a reduced fat milk or a skim milk. The ultrafiltered milk product can be formed from a commercial pasteurized skim milk or reduced fat milk. The starting milk product is placed on a filtration device with a membrane that retains molecules with a molecular weight over a selected cut off and excludes small molecules. The molecular weight cut off preferably is on the order of about 10,000 daltons. Ultrafiltration on a commercial scale generally is performed with a crossflow system that can efficiently process large volumes in a continuous or batch format.

If desired, the lactose and/or salt concentrations of the ultrafiltered milk can be increased to form high protein, moderate lactose milk prior to further processing into a frozen dessert product. One approach to increasing the lactose and salt concentrations is to add condensed milk, preferably condensed low fat or skim milk, to the ultrafiltered milk.

Generally, the high protein, moderate lactose milk contains less than about 50% by weight condensed milk, and preferably less than about 30% by weight condensed milk, with the remaining portion being ultrafiltered milk. Preferably, the condensed milk is added to the ultrafiltered milk within about 5 hours of the formation of the ultrafiltered milk, more preferably within about 2 hours and even more preferably within about 1 hour of the formation of the ultrafiltered milk.

Shortly after the formation of either the ultrafiltered milk or high protein, moderate lactose milk, soluble sugar is mixed into the milk product. If the soluble sugar is added to ultrafiltered milk, the soluble sugar is added preferably within about 5 hours of the formation of the ultrafiltered milk, more preferably within about 2 hours and even more preferably within about 1 hour of the formation of the ultrafiltered milk. If the soluble sugar is added to high protein, moderate lactose milk, the soluble sugar is added preferably within about 1 day of the formation of the high protein, moderate lactose milk, more preferably within about 5 hours and even more preferably within about 2 hours of the formation of the high protein, moderate lactose milk. In certain preferred embodiments, the soluble sugar is added in liquid form, such as a corn syrup or a liquid sucrose solution, so that liquid handling equipment can be used to perform the addition.

Once the soluble sugar is added, the milk-sugar mixture can be stored for three or more days prior to the formation of the a frozen dessert product or other product. Preferred milk-sugar mixtures can be stored for about five days, preferably about seven days and more preferably more than about seven days, while still being able to be processed with conventional equipment. A frozen dessert product is prepared by adding desired amounts of flavoring and other conventional frozen desert ingredients to the milk-sugar mixture. The sugar added as flavoring can be reduced by an amount corresponding to the amount added to slow the viscosity build-up. The desired amounts of flavorings are mixed with the milk-sugar mixture. The resulting mixture is then pasteurized, homogenized and then frozen in containers of selected size. The containers are distributed for consumption.

EXAMPLES

All percents reported in the examples are percents by weight.

Example 1

Effect of Sucrose on Viscosity of Ultrafiltered Milk

This example demonstrates the effectiveness of sucrose to retard the increase of viscosity of ultrafiltered milk.

Six samples were prepared of about 1000 g each. Sample 1 was a control with 100% ultrafiltered (UF) skim milk. The ultrafiltered milk had about 0.3% fat, 17.4% protein, about 4.7% lactose and 511 mg $Ca^{+2}$/100 g UF milk. Samples 2–6 involved blends of the UF skim milk. The UF skim milk was cooled to 40° F. (4.44° C.) for two hours prior to the formation of the blends. Sample 2 was a control blend of 72.83% ultrafiltered skim milk and 27.17% condensed skim milk. The condensed milk had about 0.2% fat, about 11.5% protein, about 17.4% lactose, and about 500 mg $Ca^{+2}$/100 g condensed milk. Sample 2 had about 0.28% fat, about 15.0% protein, about 7.6% lactose and about 508 mg $Ca^{+2}$/100 g UF milk/condensed milk blend. Samples 3–6 were blends of the following portions of ultrafiltered skim milk (UF), sucrose and water:

3 82.16% UF, 17.84% sucrose
4 75.39% UF, 16.37% sucrose, 8.25% water
5 89.23% UF, 10.77% sucrose
6 84.64% UF, 10.22% sucrose, 5.15% water The blends were formed by mechanical stirring. The samples were stored at 40° F. (4.440° C.).

The viscosity of the samples were measured initially and then at selected time intervals from the formation of the blends. The Brookfield viscosity in centipoise (cps) was measured using a Brookfield viscometer model HATDV-II (Brookfield Engineering Laboratories, Stoughton, Mass.) with a jacketed sample adapter (Brookfield part #SC4-27/13R) and a spindle #21 with enough sample (about 8 ml) to fill the sample holder. The Brookfield viscosity measurements were performed at 40° F. (4.440° C.) at 50 rpm. Small portions of the stored samples were taken for each Brookfield viscosity measurement.

The results are shown in Table 1. Duplicate samples were run at 48 hours with the average value presented in the table. Some of the samples demonstrated shear thinning or shear thickening. For these samples, two values are presented in Table 1 with the first indicating the initial Brookfield viscosity value and the second indicating the steady state Brookfield viscosity value reached under continuous stirring.

TABLE 1

(Brookfield Viscosity cps)

| Sample | Initial | 16 Hours | 24 Hours | 48 Hours | 69 Hours |
|---|---|---|---|---|---|
| 1 | 192 | 1650 | offscale | gel | — |
| 2 | 104 | 768 | 780–670 | 1500–1180 | 1700–1530 |
| 3 | 68 | 90 | 94–86 | 88 | 74 |
| 4 | 40 | 52 | 60 | 58 | 54 |
| 5 | 84 | 190–168 | 176–159 | 206–193 | 188 |
| 6 | 62 | 120–104 | 118 | 136–128 | 130 |

The results in Table 1 indicate that the addition of sucrose to ultrafiltered skim milk significantly slows the increase in viscosity of the ultrafiltered milk. The viscosity build-up observed in the samples containing added soluble sugar is significantly less than in the sample containing the ultrafiltered skim milk/condensed skim milk blend.

Example 2

Effect of Lower Sucrose Concentrations on Ultrafiltered Milk Viscosity

The ability of lower sucrose concentrations to reduce the build-up of the viscosity of ultrafiltered skim milk is shown in this example.

Sample 1 was pure ultrafiltered skim milk. The composition of the ultrafiltered skim milk was approximately the same as reported for the ultrafiltered skim milk in Example 1. The remaining samples were formed by the blending of selected amounts of sucrose with the ultrafiltered skim milk. The blending was performed immediately after cooling the ultrafiltered skim milk to 40° F. (4.44° C.). The samples were prepared as described above in Example 1.

In addition, Brookfield viscosity measurements were performed as described in Example 1. The results of the Brookfield viscosity measurements are presented in Table 2. Some of the samples demonstrated shear thinning or shear thickening. For these samples, two values are presented in Table 2 with the first value indicating the initial Brookfield viscosity value and the second value indicating the steady state Brookfield viscosity value reached under continuous stirring.

TABLE 2

(Viscosity cps)

| Sucrose % | Time (hrs) | | | |
|---|---|---|---|---|
| | 0 | 18 | 47 | 68 |
| 0.0 | 108 | 628–552 | offscale–1400 | offscale |
| 0.5 | — | 568–632 | 1980–1780 | offscale |

TABLE 2-continued (Viscosity cps)

| Sucrose % | Time (hrs) | | | |
|---|---|---|---|---|
| | 0 | 18 | 47 | 68 |
| 1.0 | — | 560–668 | 1800–1690 | offscale |
| 2.0 | — | 386 | 1210 | 1420 |
| 3.5 | — | 280 | 776–796 | 1080 |
| 5.0 | — | 156 | 488–516 | 428–488 |
| 7.5 | — | 184 | 230 | 224–244 |
| 10.0 | — | 76 | 138 | 112 |

Figure 2:
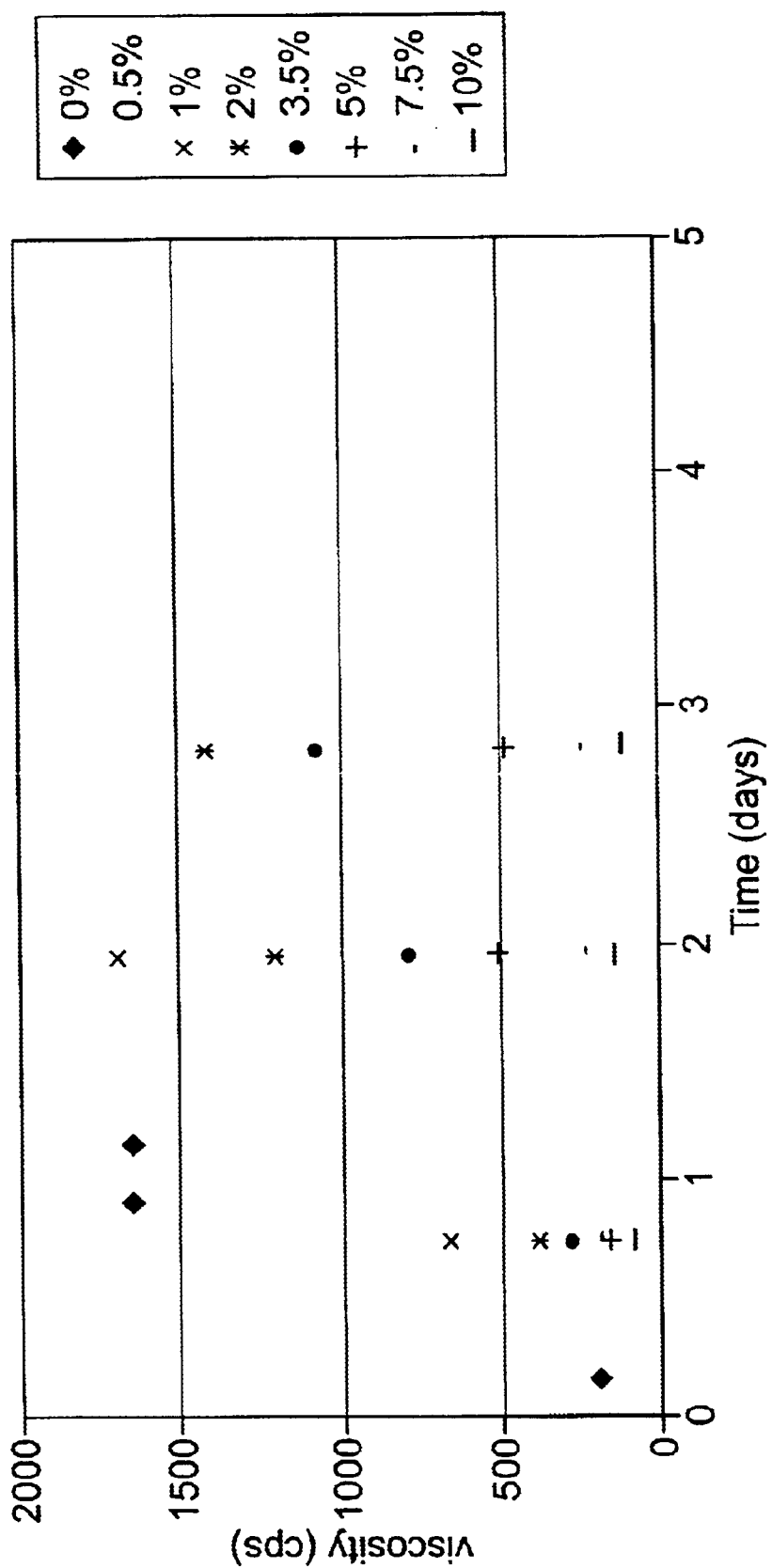
FIG. 2 is a plot of viscosity as a function of time following the formation of blends of ultrafiltered skim milk with various amounts of sucrose.

The steady state measurements are plotted in FIG. 2. The results in this Example demonstrate that lower quantities of sucrose are also effective to slow the increase of viscosity of ultrafiltered skim milk.

Example 3

UF Skim Milk/Condensed Skim Milk/Sucrose Blends

This example demonstrates the ability of sucrose to reduce the increase in viscosity of a blend of ultrafiltered skim milk and condensed milk. The qualities of frozen dessert products made from the ultrafiltered skim milk with added condensed skim milk and sucrose are shown to be effectively indistinguishable from products made with blends of UF skim milk and condensed skim milk.

The samples described in this example were formulated on a pilot plant level. A first blend (UFC blend) involved 73% UF skim milk and 27% condensed skim milk. The UFC blend was produced in a greater than 5000 gallon quantity. A second blend (UFCS blend) involved 69.35% UF skim milk, 25.65% condensed skim milk and 5% sucrose. The UFCS blend was formed in an about 2500 gallon quantity. The ultrafiltered milk and the condensed milk had composition values approximately the same as reported in Example 1.

The Brookfield viscosity in centipoise (cps) was measured using a Brookfield viscometer model HATDV-II (Brookfield Engineering Laboratories, Stoughton, Mass.) with a spindle #3 and a sample size of about 475 ml in a cup with a diameter of about 8.4 cm and a height of about 9 cm. The Brookfield viscosity measurements were performed at 40° F. (4.44° C.) at 5 rpm. Values of Brookfield viscosity were measured after one day of storage at about 40° F. (4.44° C.) and after seven days of storage at 40° F. (4.44° C.). The results were as follows:

1 Day

| UFC Blend | 200 cps |
|---|---|
| UFCS Blend | 120 cps |

7 Days

| UFC Blend | 11,600 cps |
|---|---|
| UFCS Blend | 2,040 cps |

The higher values of Brookfield viscosity relative to the measurements in Examples 1 and 2 are likely the result of using a different amount of shear in the measurements.

Viscosity of the milk-sugar blend was also measured using a Zahn cup test. A number 2 Zahn cup was used. Zahn Viscosity Cup, #2, has an orifice diameter of 2.7 mm and a 44 ml capacity; available from VWR Scientific Products Corp., Willard, Ohio. Values for the Zahn cup test represent the time for a volume of material to flow out a hole in the bottom of the cylindrically shaped Zahn cup. The Zahn cup tests were performed in duplicate. The results of the Zahn cup measurements are presented in Table 3.

TABLE 3

| Time (Hrs) | Temp (° F.) | 1st Test (seconds) | 2nd Test (seconds) |
| --- | --- | --- | --- |
| 0 | — | 40 | — |
| 16 | 43.5 | 41.9 | 41.7 |
| 30 | 42.0 | 42.2 | 43.4 |
| 40* | 42.2 | 40.2 | 40.2 |
| 51 | 39.9 | 48.0 | 48.3 |
| 63.5 | 41.1 | 45.8 | 43.9 |
| 76 | 39.7 | 48.7 | 49.6 |
| 89 | 40.2 | 52.2 | 49.8 |

*The milk sugar blend was pumped from one storage tank to another between the 30 hour and 40 hour measurements.

The Zahn cup measurements confirm that a commercial quantity of the UFCS blend is suitable for handling with standard fluid handling equipment for the production of a frozen dessert product after at least three and a half days of storage.

Both the UFC blend and the UFCS blend were formulated into a frozen dessert using the same flavorings appropriately adjusted for equivalent final sucrose content. In a triangle test, a trained test panel having three panel members were provided two sets of three portions of frozen dessert. In the first set, the tasters were provided with two portions of the flavored UFC blend and one portion of the flavored UFCS blend. In the second set, the tasters were provided with two portions of flavored UFCS blend and one portion of flavored UFC blend. In only one of the six cases, the taster correctly identified the different portion from the three possibilities. Random guessing should have produced two correct guesses. This indicates that experienced tasters could not distinguish products made with the UFC blend from products made with the UFCS blend.

Although the present invention has been described with reference to preferred embodiments, workers skilled in the art will recognize that changes may be made in form and detail without departing from the spirit and scope of the invention.

What is claimed is:

1. A stabilized concentrated aqueous milk protein dispersion comprising
    a milk protein dispersion concentrated by removing fat and lactose from a milk composition and concentrating the milk composition to increase the protein concentration by from about a 4-fold increase to an about 5.5-fold increase, and
    greater than about 3 percent by weight added soluble polyol, soluble sugar, or a combination thereof,
        wherein the weight ratio of sugar to protein of the stabilized concentrated aqueous milk protein dispersion is 1.25 or less.

2. The dispersion of claim 1 wherein the soluble sugar is selected from the group consisting of dextrose, sucrose, fructose, maltose, and mixtures thereof.

3. The dispersion of claim 1 wherein the soluble sugar is sucrose.

4. The dispersion of claim 1 wherein the soluble sugar or soluble polyol stabilizes the aqueous milk protein dispersion such that the viscosity of the aqueous milk protein dispersion does not increase to above 8000 centipoise over the seven days after formation of the aqueous dispersion.

5. The dispersion of claim 1 having a viscosity less than about 1500 cps seven days after formation of the aqueous dispersion.

6. The dispersion of claim 1 having a viscosity less than about 1500 cps three days after formation of the aqueous dispersion.

7. The dispersion of claim 1 wherein the dispersion comprises less than about 15 percent by weight lactose.

8. The dispersion of claim 1 wherein the dispersion comprises greater than about 13 percent by weight protein.

9. The dispersion of claim 1 wherein the dispersion has less than about 1 percent by weight fat.

10. A frozen dessert product prepared from the dispersion of claim 1 wherein the frozen dessert product is free of detectable lactose crystals.

11. A milk-soluble sugar mixture consisting essentially of
    a milk protein dispersion concentrated by removing fat and lactose from a milk composition and concentrating the milk composition to increase the protein concentration by from about a 4-fold increase to an about 5.5-fold increase, and
    from greater than about 3 to about 25 weight percent added soluble sugar selected from the group consisting of sucrose, dextrose, maltose, fructose; soluble polyol; or a mixture thereof, to slow viscosity build-up,
        wherein the weight ratio of sugar to protein in the milk-soluble sugar mixture is 1.25 or less, and
        wherein the mixture has a viscosity less than 5000 centipoise seven days after formation.

12. A milk-soluble sugar mixture consisting of:
    a milk protein dispersion concentrated by removing fat and lactose from a milk composition and concentrating the milk composition to increase the protein concentration by from about a 4-fold increase to an about 5.5-fold increase, and
    from greater than about 3 to about 25 weight percent added soluble sugar selected from the group consisting of sucrose, maltose, dextrose, fructose; soluble polyol; or a mixture thereof, to slow viscosity build-up; and
        wherein the weight ratio of sugar to protein in the milk-soluble sugar mixture is 1.25 or less.

13. The mixture of claim 12 having a viscosity less than about 1500 cps seven days after formation of the aqueous dispersion.

14. The mixture of claim 12 having a viscosity less than about 1500 cps three days after formation of the aqueous dispersion.

15. The mixture of claim 12 consisting of the concentrated milk protein dispersion and sucrose.

16. A milk-soluble sugar mixture consisting of:
    a milk protein dispersion concentrated by removing fat and lactose from a milk composition and concentrating the milk composition to increase the protein concentration by from about a 4-fold increase to an about 5.5-fold increase, and
    condensed milk,
    from greater than about 3 to about 25 weight percent added soluble sugar selected from the group consisting of sucrose, maltose, dextrose, fructose; soluble polyol; or a mixture thereof, to slow viscosity build-up; and
        wherein the weight ratio of sugar to protein in the milk-soluble sugar mixture is 1.25 or less.

17. The mixture of claim 16 having a viscosity less than about 1500 cps seven days after formation of the aqueous dispersion.

18. The mixture of claim 16 having a viscosity less than about 1500 cps three days after formation of the aqueous dispersion.

19. The mixture of claim 16 consisting of the concentrated milk protein dispersion, condensed milk, and sucrose.

20. A method of producing a stabilized milk-protein dispersion, the method comprising:

producing a concentrated milk-protein dispersion by removing fat and lactose from a milk composition and concentrating the milk composition to increase the protein concentration by from about a 4-fold increase to an about 5.5-fold increase, adding one or more of a soluble polyol or soluble sugar to the concentrated milk-protein dispersion to stabilize the dispersion and to produce a stabilized milk-protein dispersion having the weight ratio of sugar to protein of 1.25 or less, so the milk-protein dispersion contains greater than 3 percent by weight soluble polyol or soluble sugar, and storing the stabilized milk-protein dispersion having a weight ratio of sugar to protein of 1.25 or less, for two or more days.

21. The method of claim 20 wherein the milk-protein dispersion is sufficiently stable that upon storage for 7 days the viscosity of the milk protein dispersion remains below 8000 centipoise, the method further comprising combining the stabilized milk-protein dispersion with flavoring and then freezing to produce a frozen dessert that has a sufficiently low concentration of lactose that the frozen dessert is free of detectable lactose crystals.

22. The method of claim 21 comprising storing the stabilized milk-protein dispersion for 3 or more days between producing the milk protein dispersion and mixing the milk-protein dispersion with flavoring and freezing the mixture.

23. The method of claim 21 wherein the method does not include adding lactose to the milk-protein dispersion.

24. The method of claim 21 comprising adding condensed milk to the milk-protein dispersion.

\* \* \* \* \*